United States Patent
Komma et al.

[11] Patent Number: 5,111,448
[45] Date of Patent: May 5, 1992

[54] OPTICAL PICKUP HEAD HAVING A HOLOGRAM-ASSOCIATED OBJECTIVE LENS AND OPTICAL INFORMATION PROCESSING APPARATUS USING THE SAME

[75] Inventors: Yoshiaki Komma, Neyagawa; Shinichi Kadowaki, Hirakata; Makoto Kato, Nishinomiya; Tetsuo Saimi, Hirakata, all of Japan

[73] Assignee: Matsushita Electric Industrial Co., Ltd., Osaka, Japan

[21] Appl. No.: 362,095

[22] Filed: Aug. 6, 1989

[30] Foreign Application Priority Data

Jun. 9, 1988 [JP] Japan .................. 63-142120

[51] Int. Cl.⁵ .................................. G11B 7/00
[52] U.S. Cl. ................. 369/44.23; 369/44.24; 369/44.12; 369/116; 369/112
[58] Field of Search ........... 369/44.12, 116, 112, 369/109, 44.23, 44.24

[56] References Cited

U.S. PATENT DOCUMENTS

| | | | |
|---|---|---|---|
| 4,441,175 | 4/1984 | Shuman | 369/44.24 |
| 4,824,191 | 2/1989 | Kato et al. | 369/44.12 |
| 4,876,680 | 10/1989 | Misawa et al. | 369/412 |
| 4,918,679 | 4/1990 | Opheij et al. | 369/44.23 |

FOREIGN PATENT DOCUMENTS

| | | | |
|---|---|---|---|
| 0222238 | 5/1987 | European Pat. Off. | |
| 0249462 | 12/1987 | European Pat. Off. | |
| 0311340 | 4/1989 | European Pat. Off. | |
| 60-182526 | 5/1985 | Japan | 369/109 |
| 62-188032 | 8/1987 | Japan | |
| 63-247925 | 7/1988 | Japan | 369/109 |
| 63-229640 | 9/1988 | Japan | |
| 1-62838 | 3/1989 | Japan | |
| 1-94541 | 4/1989 | Japan | |
| 1-94542 | 4/1989 | Japan | |
| 1-311428 | 6/1989 | Japan | 369/109 |
| 2-81335 | 10/1990 | Japan | 369/109 |

OTHER PUBLICATIONS

Goto et al., "Spherical Grating Objective Lenses for Optical Disk Pick-ups", Japanese Journal of Applied Physics, Supplements, vol. 26, No. 4, pp. 135-140, Tokyo, Japan, 1987.

Primary Examiner—Roy N. Envall, Jr.
Assistant Examiner—Nabil Hindi
Attorney, Agent, or Firm—Stevens, Davis, Miller & Mosher

[57] ABSTRACT

An optical pickup head for performing recording, reproducing and erasing of information on an optical disc in an optical system employs an objective lens, which is integrated or combined with a holographic optical element, so that the focusing of a diffraction beam on a photo-sensor is stabilized irrespective of the movement of the objective lens due to the tracking control operation in the optical system.

8 Claims, 12 Drawing Sheets

PRIOR ART

OPTICAL PICKUP HEAD HAVING A HOLOGRAM-ASSOCIATED OBJECTIVE LENS AND OPTICAL INFORMATION PROCESSING APPARATUS USING THE SAME

BACKGROUND OF THE INVENTION

1. Field of the Invention

This invention relates to an optical information processing apparatus and an optical pickup head used for recording, erasing or reproducing information in the optical information processing apparatus.

2. Description of the Prior Art

Figure 1:
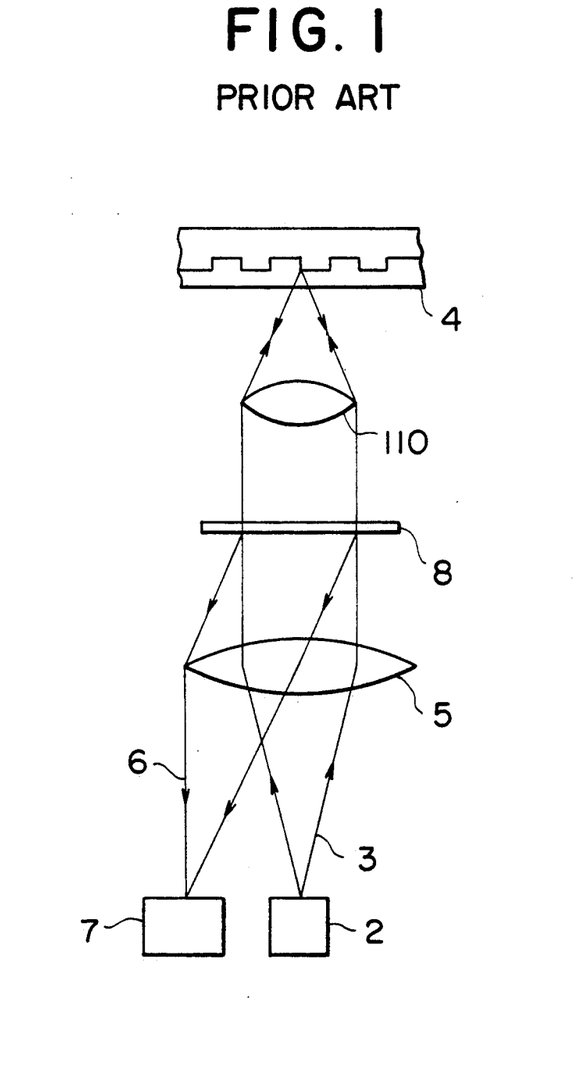
FIG. 1 is a schematic cross-sectional diagram showing a conventional optical pickup head.
Figure 2A:
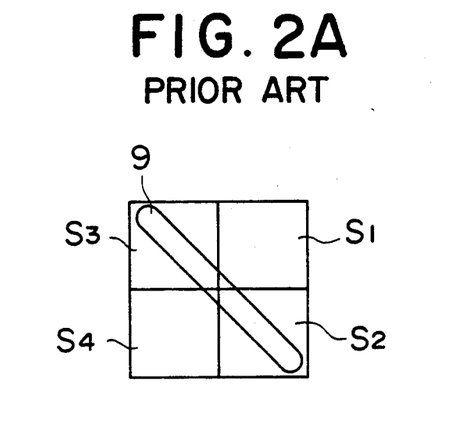
FIGS. 2A, 2B and 2C are a set of plan views showing the shape of a diffraction beam for focus error signal detection on the detector in the conventional optical pickup head.
Figure 2B:
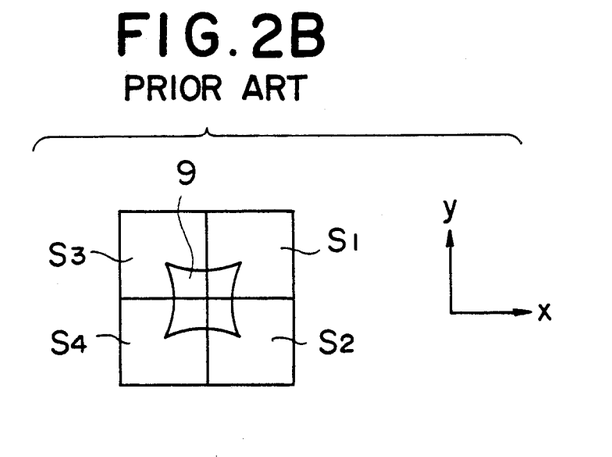
Figure 2C:
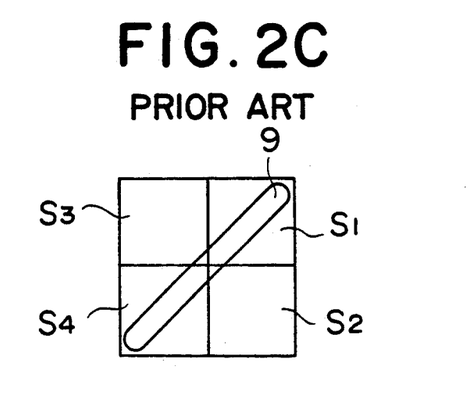

A recent optical pickup head, with its optical system being simplified using a hologram, is shown in FIG. 1. (Refer to JP-A-62-188032, for example.) In FIG. 1, indicated by 2 is a semiconductor laser source. A laser beam 3 produced by the light source passes through a hologram 8 and is projected onto an objective lens 110, and then it is focussed on an optical disc 4. The beam reflected by the optical disk returns along the same optical path and is incident on the hologram 8. A diffraction beam produced by the hologram is incident on a detector 7. The diffraction beam is designed to have astigmatic aberration so that its form varies due to a defocussed condition of the objective lens with respect to the optical disc, as shown in FIGS. 2A, 2B and 2C. In the figures, FIG. 2B indicates an in-focus state, and FIGS. 2A and 2C indicate out-of-focus states. Indicated by 9 is a diffraction beam for producing a focus error signal FE, which is calculated from the photodetector outputs through the following calculation.

$$FE = (S1 + S4) - (S2 + S3) \quad (1)$$

A tracking error signal TE is obtained by utilizing a diffraction image (far field pattern (FFP)) formed by tracks or pit strings on the disc. In FIG. 2, when the y-axis is defined to be parallel to the tracks or pit strings on the disc, the tracking error is calculated from the photodetector outputs through the following calculation.

$$TE = (S1 + S2) - (S3 + S4) \quad (2)$$

Figure 3:
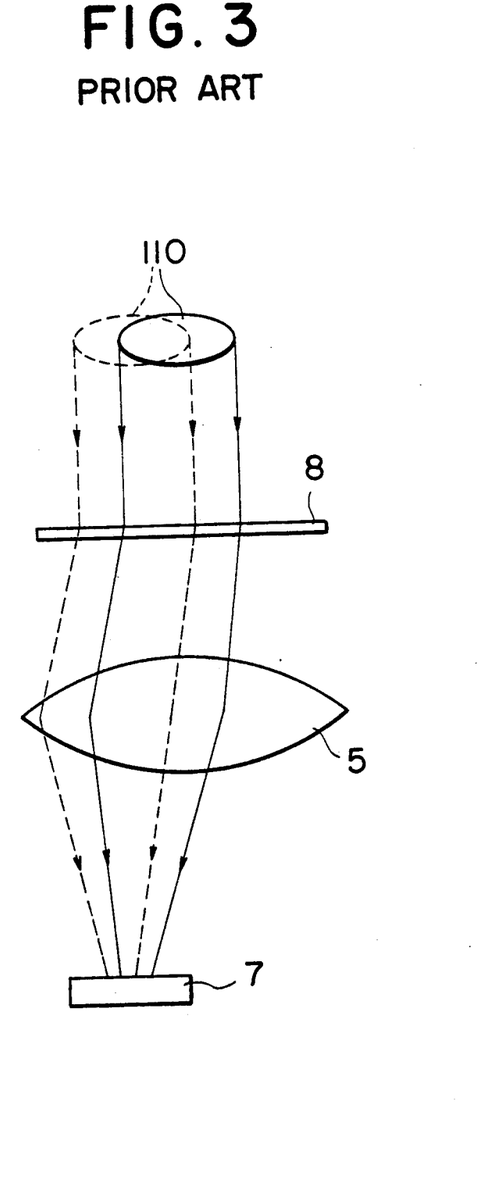
FIG. 3 is a cross-sectional diagram showing the return path of an optical beam in the conventional optical pickup head.
Figure 4:
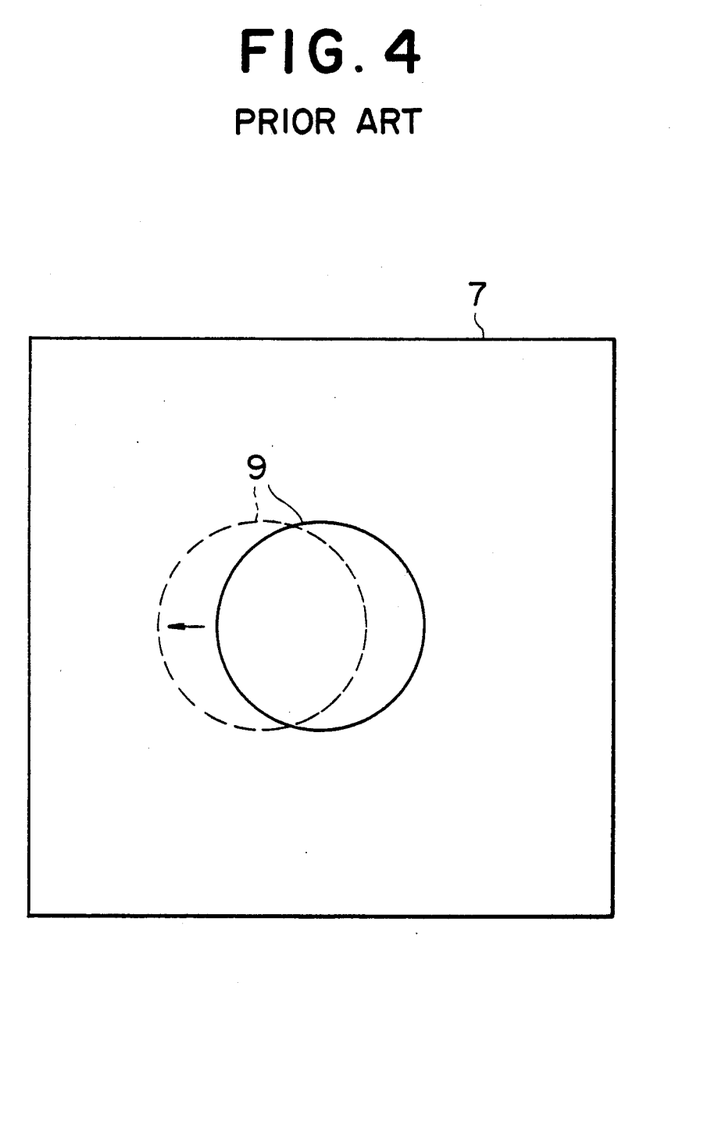
FIG. 4 is a plan view showing the movement of a diffraction beam on the detector in the conventional optical pickup head.
Figure 5:
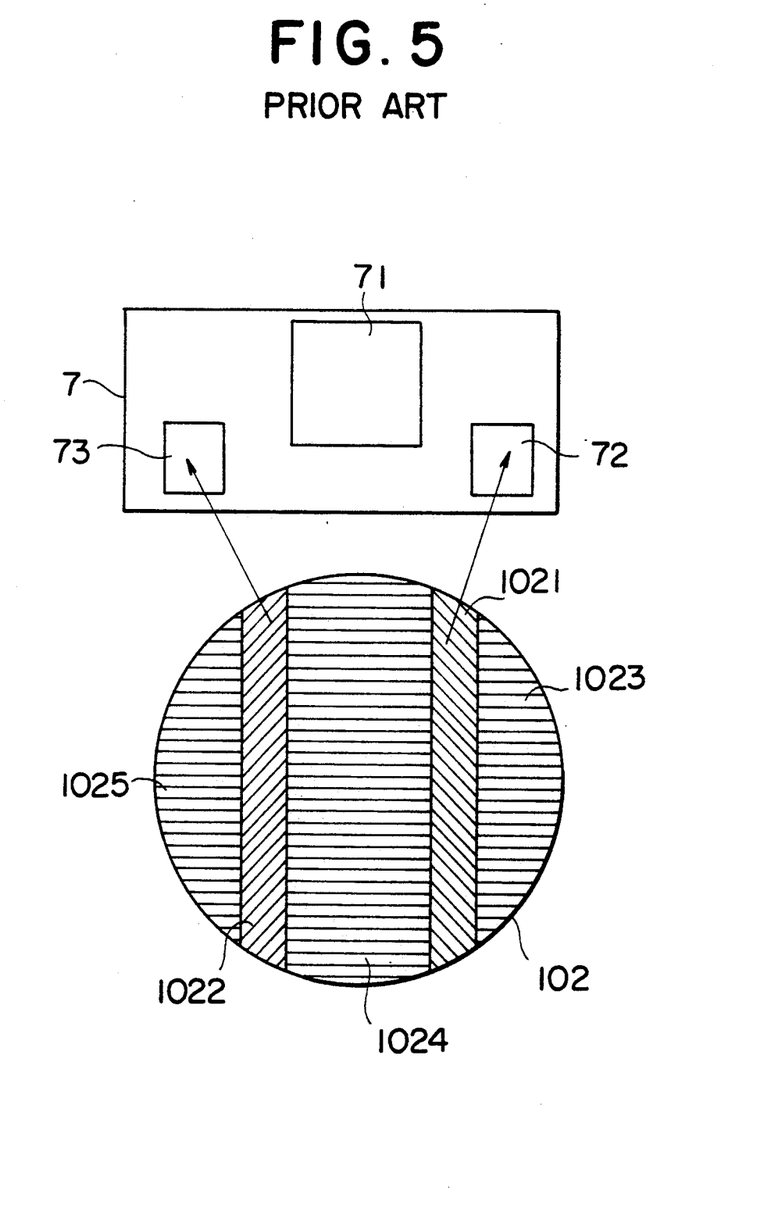
FIG. 5 is a schematic diagram for explaining the arrangement of a hologram and a detector in the embodiment of this invention and also in a conventional system.

In such an optical system, however, when the objective lens is moved by the operation of a tracking servo system, the incident position of the optical beam on the hologram surface is shifted by several hundred microns as shown by the dashed line in FIG. 3 (the figure omits the illustration of the optical system from the light source to the optical disc and a part of the optical beam). For this reason, the diffraction beam is moved about by 10% of the beam diameter on the photodetector, as shown by the dashed line in FIG. 4. Assuming that the y-axis defined to be parallel to the tracks or pit strings on the disc in FIG. 2, the diffraction beam is caused to move in the x-axis direction by the tracking control. In this case, an offset appears in the TE signal, as will be seen from the equation (2). In order to suppress this offset within an allowable limit, the lens is allowed to move through ±200 μm at the greatest. Actually, the objective lens moves through about ±500 μm thereby causing a tracking deviation to occur and hence signal detection to become impossible. The TE signal can also be produced in a different manner that other diffraction gratings 1021 and 1022 are provided at a part of the hologram 102 as shown in FIG. 5, and diffraction beams from the gratings 1021 and 1022 are detected by tracking error signal detectors 72 and 73 provided in addition to the focus error signal detector 71 in the photodetector 7. The TE signal can be obtained from a difference in the quantity of detected light. Since the phase difference between the 0-order diffraction beam and the first order diffraction beam coming from the tracks among the FFP is always π/2 even in the occurrence of defocusing, by providing the diffraction beam generation regions 1021 and 1022 for tracking error signal detection in addition to the diffraction beam generation regions 1023, 1024 and 1025 for focus error signal detection at the portions of the hologram on which the optical beam is incident, the tracking servo can be stabilized against the defocusing. Even in this case, however, the movement of the optical beam, which is incident on the hologram, due to the movement of the objective lens 110 causes an offset to be produced in the TE signal in the same way as the preceding case.

Another problem caused by the movement of the diffraction beam on the detector is the deterioration of characteristics of the focus error detection, such as deteriorated sensitivity, which results in the occurrence of defocusing. This problem also occurs in optical systems using lenses and half mirrors that are adopted in the optical pickup heads currently in the market.

Figure 6:
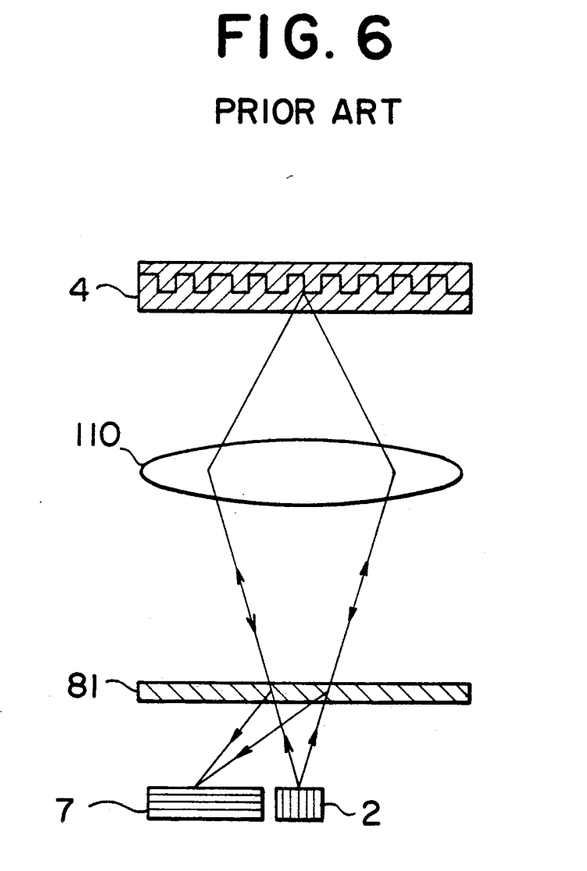
FIG. 6 is a schematic cross-sectional diagram showing another conventional optical pickup head.

When the collimating lens is omitted thereby to further reduce the number of component parts of the optical pickup head, as shown in FIG. 6, the optical beam diameter on the hologram 81 becomes smaller proportionately as the hologram departs from the objective lens 110. Therefore, it becomes necessary to adjust the position of the hologram to the optical beam more accurately. For example, when the hologram and photodetector are disposed to be apart from each other about by 5 mm so that they may be contained in a single package, the positioning of the hologram and the photodetector should be made with accuracy within ±50 μm in the direction perpendicular to the optical axis.

SUMMARY OF THE INVENTION

Accordingly, an object of this invention is to realize compactness and weight reduction of an optical pickup head and to improve its reliability and mass productivity.

In order to achieve the above object, the optical pickup head of this invention uses a hologram-associated integrated lens, in which the hologram is formed directly on the lens to be integral therewith, for receiving an optical beam reflected from an optical disc and producing a diffraction beam, or the optical pickup head of the present invention uses a hologram-combined lens thereby to cause the hologram to move interlinked with the lens, so that a returning optical beam is incident on a fixed portion of the hologram, regardless of the movement of the objective lens due to the tracking control, whereby the diffraction beam produced by the hologram and incident on the detector does not shift on the detector. In addition, because of the location of the hologram in the vicinity of the objective lens, the optical beam incident on the hologram has substantially the same diameter as that of the optical beam passing through the objective lens. Accordingly, required accuracy of assembling the hologram in the system may be reduced.

In consequence, the present invention accomplishes compactness and weight reduction of an optical pickup head, stabilization of servo signals and simplification of assembling processes.

The optical information processing apparatus using the above-mentioned optical pickup head is free from defocusing by the tracking control, and therefore the present invention is also able to provide a reliable, inexpensive and compact optical information processing apparatus.

DETAILED DESCRIPTION OF THE PREFERRED EMBODIMENTS

Figure 7A:
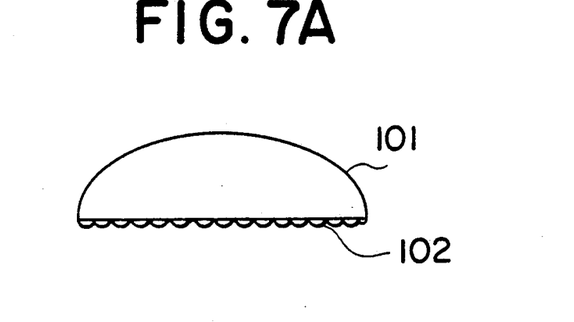
FIGS. 7A, 7B and 7C are a set of schematic cross-sectional diagrams showing the structure of a hologram-associated lens of an essential requirement of the present invention.
Figure 7B:
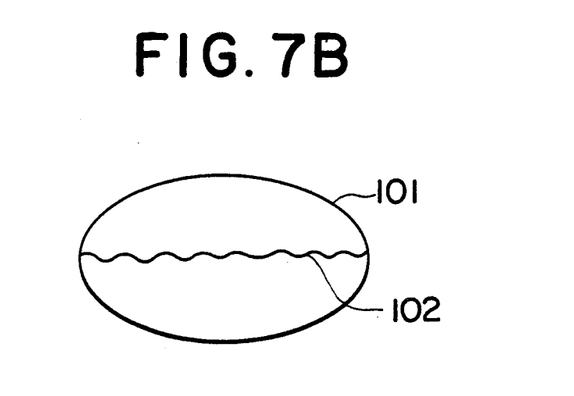
Figure 7C:
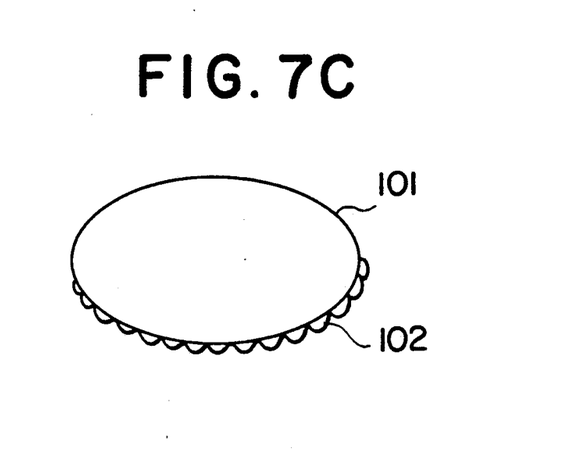

Embodiments of this invention will be described with reference to the drawings. FIGS. 7A, 7B and 7C and FIG. 9 show embodiments of a hologram-integrated lens and a lens hologram-combined lens, respectively. As shown in FIGS. 7A, 7B and 7C, an optical lens 101 and a hologram 102 are formed integrally. The integration of the hologram and lens gives a most remarkable effect in weight reduction. During fabrication, the lens 101 is directly etched by a lithographic process, or a relief-type hologram 102 is readily formed by utilizing a photopolymerization process as proposed by K. Goto et al. in Japanese Journal of Applied Physics, Vol. 26 (1987), Supplement 26-4. Further, in the case of forming a lens 101 by injection, a hologram pattern is formed beforehand by etching or the like on the surface of an injection die, whereby a hologram-integrated lens can be readily fabricated.

Figure 8A:
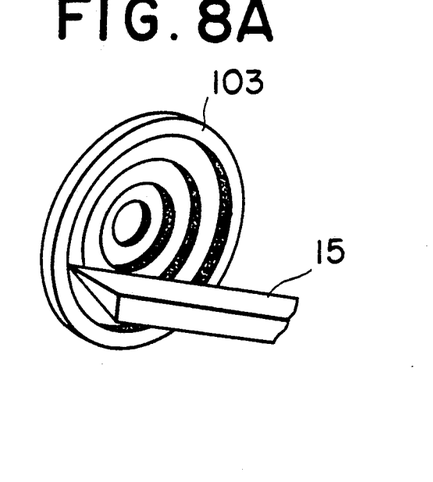
FIGS. 8A, 8B and 8C are a set of explanatory diagrams illustrating methods of producing a master of a hologram to be formed integrally with a lens.
Figure 8B:
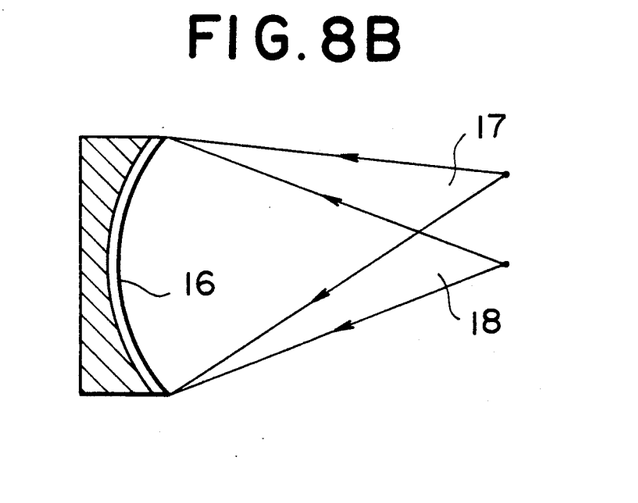
Figure 8C:
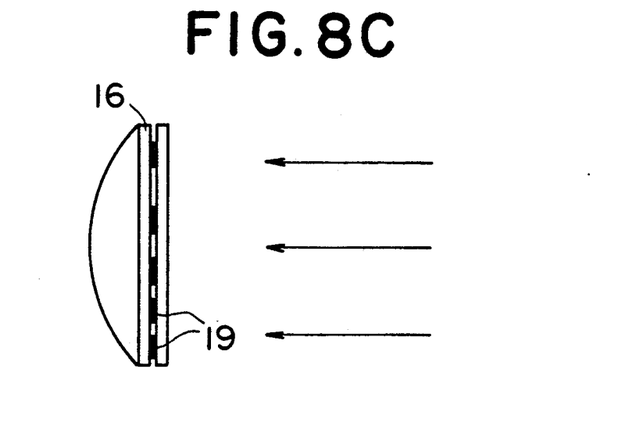

The master 103 of a hologram used in the photopolymerization process or injection formation process can be fabricated by mechanical cutting using a cutting tool 15 as shown in FIG. 8A, as proposed by K. Goto et al. A further method of fabricating a hologram master is to form a hologram master on a surface having a photoresist 16 applied thereto by the two-beam interference method employing an object beam 17 and a reference beam 18, as shown in FIG. 8B, or to form a hologram pattern 19 by using a computer and transcribing it onto the photoresist 16, as shown in FIG. 8C.

In the case of forming a hologram on a curved surface, a hologram is formed by using interference fringes produced by the object beam and the reference beam, as shown in FIG. 7C. When using a combination of a plurality of lenses, a hologram can be formed in a flat plane, as shown in FIG. 7B, and a short focal distance lens may be fabricated.

Figure 9:
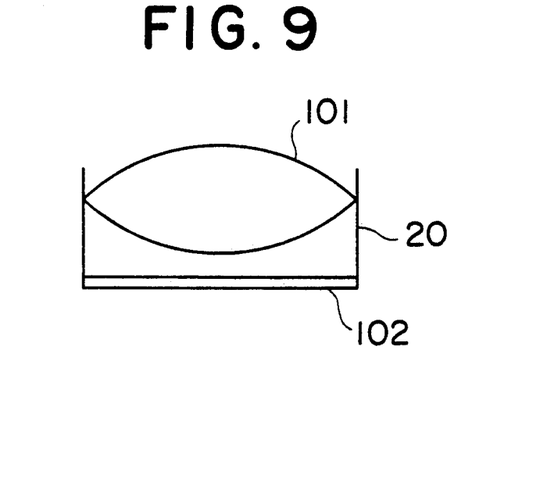
FIG. 9 is a schematic cross-sectional diagram showing a hologram-combined lens used in another embodiment of this invention.

As shown in FIG. 9, a hologram 102 and a lens 101 may be formed separately and both elements are bonded together or packaged by using a packaging means 20, whereby a hologram-combined lens can be readily fabricated. In the case where the lens 101 is fabricated by the combination of a plurality of lenses, the hologram 102 is inserted between two lenses.

Figure 10:
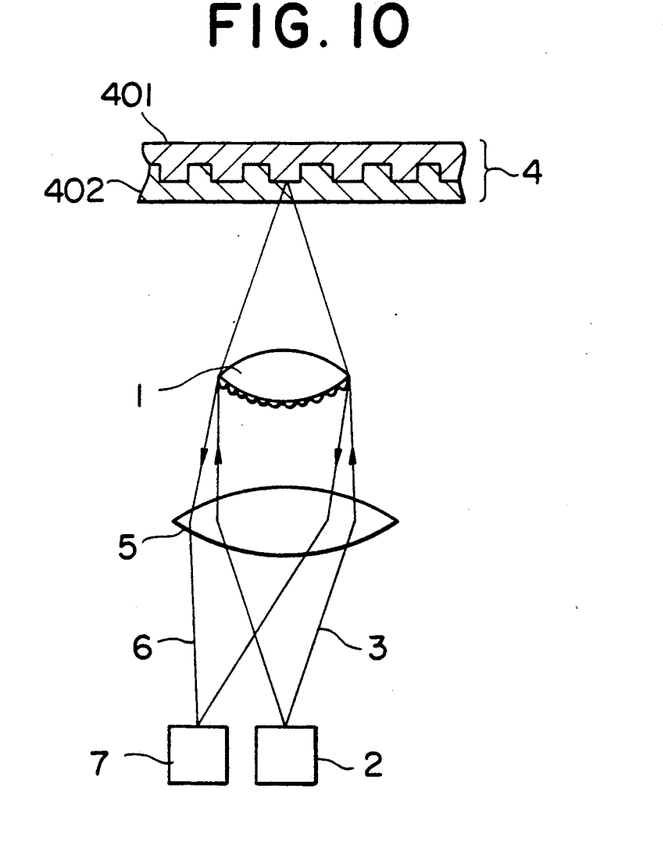
FIG. 10 is a schematic cross-sectional diagram showing an optical pickup head of another embodiment of this invention.

FIG. 10 is a diagram used to explain the principle of the embodiments of this invention. Although a light source 2 may include an optical system for the wave front correction, it is not directly related to this invention and an explanation thereof will be omitted. An optical beam 3 produced by the light source 2 is turned to a parallel light beam by being transmitted through a collimating lens 5, and it is focused on an optical disc 4, which is an information medium including a substrate 401 and a protection film 402, through an objective lens 1 with which a hologram is formed integrally or with which a hologram is combined. An optical beam reflected by the information recording/reproduction surface of the optical disc 4 is incident backward on the objective lens 1. A plus-1 order diffraction beam (or a minus-1 order diffraction beam) 6 diffracted by the hologram is collimated by collimating lens 5 and is incident on a detector 7 disposed in the vicinity of the light source 2.

Figure 11A:
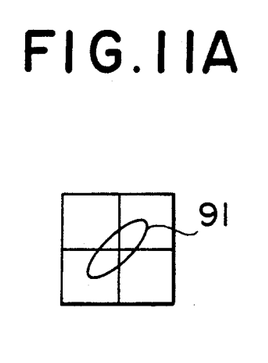
FIGS. 11A, 11B and 11C are a set of explanatory diagrams illustrating a detector and an associated electronic circuit used in the other embodiment of this invention and in a conventional system.
Figure 11B:
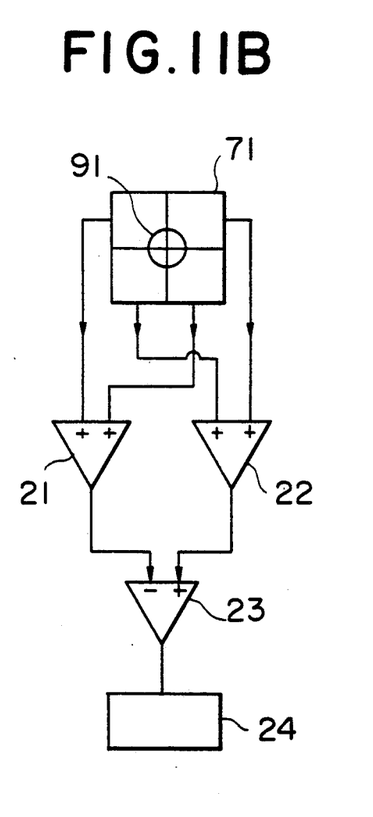
Figure 11C:
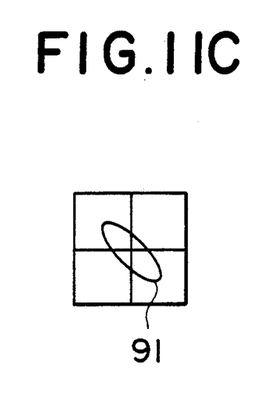

The detector 7 is divided into a plurality of regions. The signal level of each region for the diffraction beam incident on the detector varies depending on the focusing condition, and a focus error signal is obtained from these signals. When the astigmatic method is used to produce the focus error signal, a hologram, which is a record of the astigmatic wave front, and a 4-division detector 71 shown in FIGS. 11A, 11B and 11C are used, in the same way as in the conventional case (JP-A-62-188032). In FIGS. 11A, 11B and 11C 91 denotes the diffraction beam for focus error signal detection. In the figures, FIG. 11B indicates an in-focus state, and FIGS. 11A and 11C indicate out-of-focus states. The detector is formed by a reverse-biased pn junction of silicon, for example. An output current from the detector increases in response to an increase in the quantity of incident light. Accordingly, the focus error FE is evaluated from the magnitude of the current through the calculation of the equation (1).

Figure 12A:
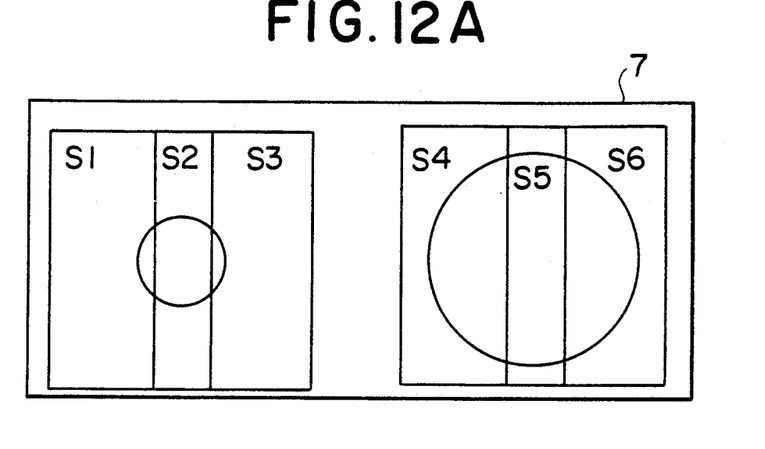
FIGS. 12A, 12B and 12C are a set of plan views showing the shape of a diffraction beam for focus error signal detection on the detector in the other embodiment of this invention.
Figure 12B:
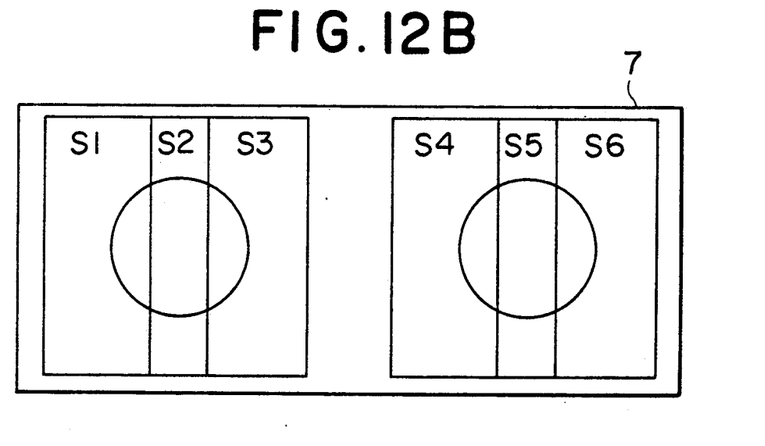
Figure 12C:
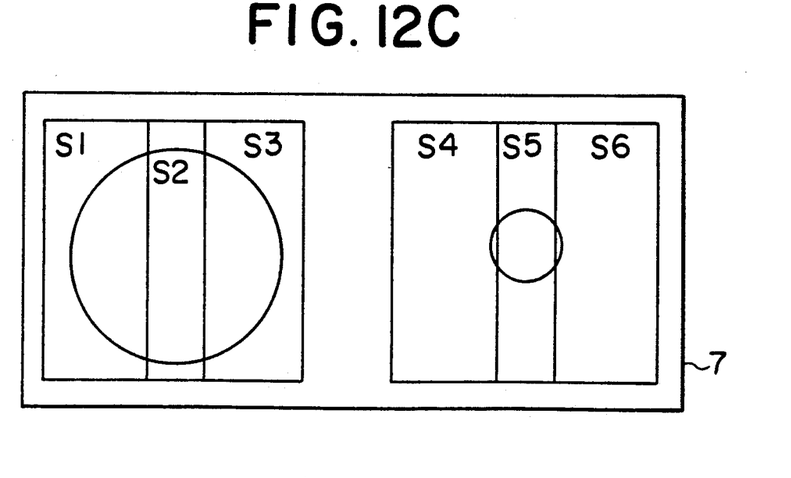

On the other hand, when using a diffraction beam having a focal point at the front or back of the image plane as a diffraction beam for producing a focus error signal, as was disclosed in JP-A-63-229640, JP-A-01-94541 and JP-A-01-94542, the hologram is composed of a single Fresnel zone plate or composite Fresnel zone plates, and in this case the shape of a diffraction beam on the detector 7 is as shown in FIGS. 12A, 12B and 12C. In the figures, FIG. 12B indicates an in-focus state, and FIGS. 12A and 12C indicate out-of-focus states. The focus error signal FE is evaluated by the magnitude of signals that are substantially proportional to the quantity of light incident on the divided regions of the detector through the following calculation.

$$FE = (S1 + S3 - S2) - (S4 + S6 - S5) \quad (3)$$

Further, a tracking error be produced from the diffraction beam for focus error signal detection. According to the present invention, it is possible to achieve more stable signal detection by the use of a divided structure of the hologram 102 shown in FIG. 5, wherein a diffraction beam other than the diffraction beam for focus error signal detection is obtained separately from the sections 1021 and 1022 of the hologram 102 located at regions thereof of the largest variation in the far field pattern in respect of the tracking error. In this case, the focus error is produced from sections 1023, 1024 and 1025 of the hologram.

Figure 13:
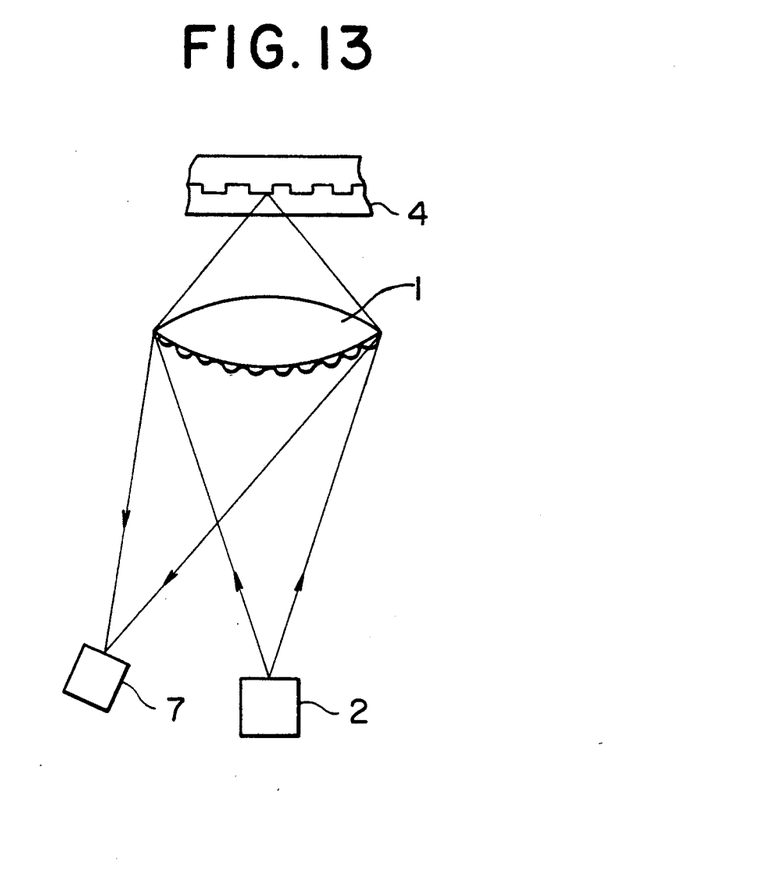
FIG. 13 is a schematic cross-sectional diagram showing an optical pickup head of a further embodiment of this invention.

As another embodiment required to make the optical pickup head much smaller, the optical system is configured as shown in FIG. 13 so that the collimating lens of FIG. 10 is omitted, thereby making it possible to reduce the number of component parts, weight and manufacturing cost, and moreover, this embodiment does not necessitate high-accuracy positioning of the hologram.

Figure 14:
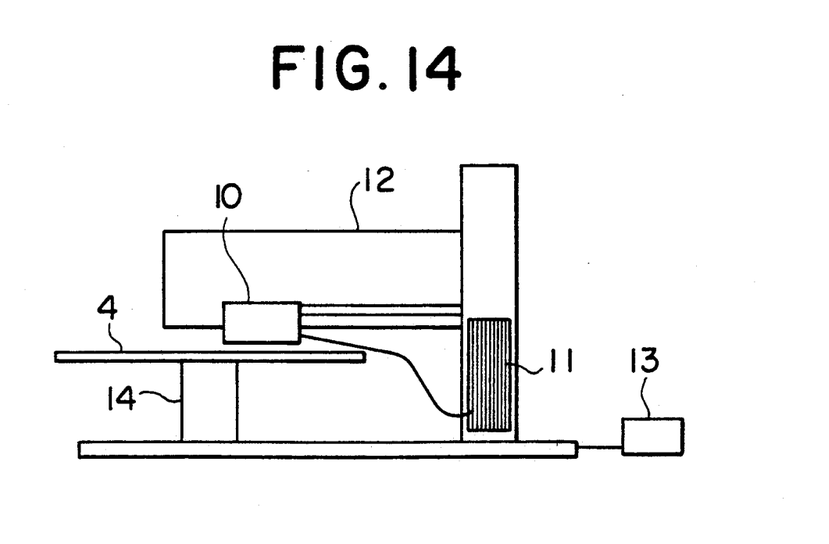
FIG. 14 is a schematic cross-sectional diagram showing an optical information processing apparatus of an embodiment of this invention.

Finally, FIG. 14 shows an embodiment of the optical information processing apparatus in which the foregoing optical pickup head is used. In the figure, a disc 4 is rotated by a disc drive mechanism 14. An optical pickup head 10 is driven roughly toward a position over a track of the optical disc by an optical pickup head drive unit 12. The optical pickup head 10 sends a focus error signal and a tracking error signal, which reflect its positional relation with the optical disc, to an electric circuit 11. Shown by 13 is a power source or a means for connection to an external power supply. The electric circuit 11 performs adding operations by adding circuits 21 and 22 and subtracting operations by a differential circuit 23 on the outputs from the divided regions of the detector, and thereafter performs filtering, amplification, etc. by a signal processing circuit 24, as shown in FIG. 11, for example. The circuit sends signals for finely driving the objective lens to the optical pickup head. The optical pickup head responds to these signals to perform focusing servo control and tracking servo control with respect to the optical disc 4, thereby effecting reading and writing of information on the optical disc 4.

What is claimed is:

1. An optical pickup head, comprising:
a radiation light source for emitting a light beam;
a hologram-integrated lens means comprising a hologram formed directly on a conventional refraction-type lens to be integral therewith, for receiving said light beam emitted from said radiation light source and converging the light beam on an optical disc, said hologram comprising means for generating a diffraction light beam when light reflected from said optical disc is incident on said hologram-integrated lens means; and
a photodetector means, responsive to a first beam portion of said diffraction light beam, for producing an output signal comprising a focusing error component, for effecting focusing servo control of said optical disc, said first beam portion including two spherical wave fronts having focal points positioned respectively on front and rear sides of a light receiving plane of said photodetector means when said diffraction light beam is received by said photodetector means, said output signal being proportional to the intensity of the diffraction light beam, and
said radiation light source and said photodetector means being disposed adjacent to each other in a plane oriented generally normal to a propagation direction of said light beam emitted by said radiation source.

2. An optical pickup head, comprising:
a radiation light source for emitting a light beam;
a hologram-combined lens means comprising a hologram combined with a conventional refraction-type lens through a combining means, for receiving said light beam emitted from said radiation light source and converging the light beam on an optical disc, said hologram comprising means for generating a diffraction light beam when light reflected from said optical disc is incident on said hologram-integrated lens means; and
a photodetector means, responsive to a first beam portion of said diffraction light beam, for producing an output signal comprising a focusing error component for effecting focusing servo control of said optical disc, said first beam portion including two spherical wave fronts having focal points positioned respectively on front and rear sides of a light receiving plane of said photodetector means when said diffraction light beam is received by said photodetector means, said output signal being proportional to the intensity of the diffraction light beam, and
said radiation light source and said photodetector means being disposed adjacent to each other in a plane oriented generally normal to a propagation direction of said light beam emitted by said radiation source.

3. An optical pickup head according to claim 1, wherein said hologram comprises a holographic optical element means for producing in the diffraction light beam a second beam portion from hologram portions on which a far field pattern portion of the light beam incident on said hologram impinges, said far field pattern portion delicately varying particularly in response to a position at which a converging light beam impinges on the optical disc, said photodetector means, responsive to said second beam portion, producing a tracking error component of said output signal for effecting tracking control on said optical disc.

4. An optical pickup head according to claim 2, wherein said hologram comprises a holographic optical element means for producing in the diffraction light beam a second beam portion from hologram portions on which a far field pattern portion of the light beam incident on said hologram impinges, said far field pattern portion delicately varying particularly in response to a position at which a converging light beam impinges on the optical disc, said photodetector means, responsive to said second beam portion, producing a tracking error component of said output signal for effecting tracking control on said optical disc.

5. An optical information processing apparatus comprising: (a) at least one optical pickup head including:

a radiation light source for emitting a light beam;

a hologram-integrated lens means comprising a hologram formed directly on a conventional refraction-type lens to be integral therewith, for receiving said light beam emitted from said radiation light source and converging the light beam on an optical disc, said hologram comprising means for generating a diffraction light beam when light reflected from said optical disc is incident on said hologram-integrated lens means; and a photodetector means for receiving said diffraction light and producing an output signal comprising a focusing error component for effecting focusing servo control of said optical disc, said first beam portion including two spherical wave fronts having focal points positioned respectively on front and rear sides of a light receiving plane of said photodetector means when said diffraction light beam is received by said photodetector means, said output signal being proportional to the intensity of the diffraction light beam, and said radiation light source and said photodetector means being disposed adjacent to each other in a plane oriented generally normal to a propagation direction of said light beam emitted by said radiation source;

(b) a drive mechanism for rotatably driving said optical disc;

(c) a focus servo mechanism and a tracking error mechanism using said focusing error component and said tracking error component, respectively, of said output signal generated by said photodetector means;

(d) electric circuits for composing said servo mechanisms, respectively; and (e) at least one of a power source and a connecting means for connection to an external power supply for feeding said electric circuits.

6. An optical information processing apparatus comprising:

(a) at least one optical pickup head including:

a radiation light source for emitting a light beam;

a hologram-integrated lens means comprising a hologram combined with a conventional refraction-type lens through a combining means, for receiving said light beam emitted from said radiation light source and converging the light beam on an optical disc and said hologram comprising means for generating a diffraction light beam when light reflected from said optical disc is incident on said hologram-integrated lens means; and a photodetector means for receiving said diffraction light beam and producing an output signal comprising a focusing error component for effecting focusing servo control of said optical disc, said first beam portion including two spherical wave fronts having focal points positioned respectively on front and rear sides of a light receiving plane of said photodetector means when said diffraction light beam is received by said photodetector means, said output signal being proportional to the intensity of the diffraction light beam, and said radiation light source and said photodetector being disposed adjacent to each other in a plane oriented generally normal to a propagation direction of said light beam omitted by said radiation source;

(b) a drive mechanism for rotatably driving said optical disc;

(c) a focus servo mechanism and a tracking error mechanism using said focusing error component and said tracking error component, respectively, of said output signal generated by said photodetector means;

(d) electric circuits for composing said servo mechanisms, respectively; and (e) at least one of a power source and a connecting means for connection to an external power supply for feeding said electric circuits.

7. An optical information processing apparatus according to claim 5, wherein said hologram comprises a holographic optical element means for producing in the diffraction light beam a second beam portion from hologram portions on which a far field pattern portion of the light beam incident on said hologram impinges, said far field pattern portion delicately varying particularly in response to a position at which a converging light beam impinges on the optical disc, said photodetector means, responsive to said second beam portion, producing a tracking error component of said output signal for effecting tracking control on said optical disc.

8. An optical information processing apparatus according to claim 6, wherein said hologram comprises a holographic optical element means for producing in the diffraction light beam a second beam portion from hologram portions on which a far field pattern portion of the light beam incident on said hologram impinges, said far field pattern portion delicately varying particularly in response to a position at which a converging light beam impinges on the optical disc, said photodetector means, responsive to said second beam portion, producing a tracking error component of said output signal for effecting tracking control on said optical disc.

* * * * *

UNITED STATES PATENT AND TRADEMARK OFFICE
CERTIFICATE OF CORRECTION

PATENT NO. : 5,111,448

DATED : May 5, 1992

INVENTOR(S) : Yoshiaki KOMMA ET AL

It is certified that error appears in the above-identified patent and that said Letters Patent is hereby corrected as shown below:

Title Page, after [22] Filed:

"Aug. 6, 1989" should read --June 6, 1989--.

Signed and Sealed this

Twenty-first Day of September, 1993

*Attest:*

BRUCE LEHMAN

*Attesting Officer*   *Commissioner of Patents and Trademarks*